United States Patent [19]
Curtis et al.

[11] Patent Number: 5,892,601
[45] Date of Patent: Apr. 6, 1999

[54] MULTIPLEX HOLOGRAPHY

[75] Inventors: Kevin Curtis, Chatham; William Larry Wilson, Somerville, both of N.J.

[73] Assignee: Lucent Technologies Incorporated, Murray Hill, N.J.

[21] Appl. No.: 888,357

[22] Filed: Jul. 3, 1997

Related U.S. Application Data

[63] Continuation of Ser. No. 435,682, May 5, 1995, abandoned.

[51] Int. Cl.[6] .................................................. G03H 1/26
[52] U.S. Cl. ................................ 359/22; 359/30; 359/29; 369/103
[58] Field of Search ................................. 359/12, 21, 22, 359/24, 25, 29, 30, 31, 32; 365/125, 216; 369/103

[56] References Cited

U.S. PATENT DOCUMENTS

| | | | |
|---|---|---|---|
| 4,094,011 | 6/1978 | Nagao | 365/216 |
| 4,915,464 | 4/1990 | Hopwood | 359/12 |
| 5,007,690 | 4/1991 | Chern et al. | 359/11 |
| 5,483,365 | 1/1996 | Pu et al. | 359/11 |

OTHER PUBLICATIONS

*Appl. Phys. Lett.* vol. 26, No. 4, p. 183 (1975).
G.A. Rakuljic, et al., "Optical data storage by using orthogonal wavelength–multiplexed volume holograms", *Optical Letters*, vol. 17, No. 20, pp. 1471 (1992).
K. Curtis, et al., "Method for holographic storage using peristropic multiplexing", vol. 19, No. 13, pp. 993–994 (1994).
H. Lee, "Volume holographic interconnections with maximal capacity with minimal cross talk", *J. Appl. Phys.* vol. 65, No. 6, pp. 2191–2194, (1989).
A.P. Yakimovich, "Selective protperties of 3–D holographic gratings using spherical wave fronts", *Opt. Spectros.* (USSR), vol. 47, No. 5, PP. 530–535 (1979).
A. Pu, et al., "Shift Holography", 1995 OSA Conf. on Optical Computing, see conf. proc. *Tech. Digest Series,* vol. 10, pp. 219–221.
*Optical Engin.*, vol. 32, No. 8, pp. 1839–1847 (1993).
*Handbook of Optical Holography,* Academic Press 1979, pp. 373–377.
*Optics Letters,* vol. 17, No. 8, pp. 676–678 (1992).
*Holography Handbook,* Ross Books, Berkeley,CA, pp. 56,57 (1993).
*CD–ROM Librarian,* vol. 7, No. 4, pp. 16–21, (1992).

*Primary Examiner*—Jon W. Henry
*Assistant Examiner*—Darren E. Schuberg
*Attorney, Agent, or Firm*—George S. Indig

[57] ABSTRACT

Use of an aperture in the reconstructed beam in reconstruction of multiple holograms increases selectivity beyond that realizable by spatial multiplexing so as to permit differentiation of overlapping images. "Aperturization" is suitably used for differentiation in the y-direction in shift holography, depending on Bragg selection in the x-direction.

18 Claims, 2 Drawing Sheets

MULTIPLEX HOLOGRAPHY

This application is a continuation of application Ser. No. 08/435,682, filed on May. 5, 1995, now abandoned.

TECHNICAL FIELD

Holography.

DESCRIPTION OF RELATED ART

Holography has had great allure since its inception in 1948. The concept, image recording and reconstruction by interference with a reference beam, has, from the start, provoked interest in artistic circles. Its very large storage capacity soon led to contemplated use for digital data storage. Both were given impetus by the introduction of the laser, which would serve as a practical high-intensity monochromatic light source.

The desire to maximize capacity soon led to multiplexing. A number of means were available for differentiating between successive holograms recorded within the medium. Angle multiplexing differentiates on the basis of different angles of incidence for the reference beam. See, D. L. Staebler, et al., "Multiple storage and erasure of fixed holograms in Fe-doped $LiNbO_3$", Appl. Phys. Lett., vol. 26, no. 4, p. 183, (1975). Alternatively, differentiation between multiplexed holograms may be based on wavelength. See, G. A. Rakuljic and V. Leyva, OPTICS LETTS., vol. 17, no. 20, p. 1471, (1992).

In "peristrophic multiplexing", the medium is rotated about the axis defined by the intersection of the beams to permit angular differentiation of successive holograms within the same volume, with packing density depending on signal bandwidth. See, Optics Letters, vol. 19, no. 13, pp. 993,994, July 1994. In another process, "fractal sampling" grids permit multiplexing again within the same volume. Here, holograms are stored in the degenerate direction with angular spacing dependent on signal bandwidth. See, J. Appl. Phys., vol. 65, no. 6, pp. 2191–2194, March 1989.

Instead of using the same medium volume, "Spatial multiplexing" records successive holograms in different regions of the medium. Density is limited by hologram size and the need to avoid significant overlapping.

"Volume holography" uses a thick recording medium. The thickness dimension is essential for translating angle change, as well as wavelength change, into Bragg selectivity. A. P. Yakimovich, in Opt Spectrosc. (USSR) vol. 47, no. 5, November 1979, at pp. 530–535, describes use of a spherical reference beam, in lieu of the usual plane wave, and calculates Bragg selectivity. Implications in differentiating overlapping images are clear.

"Shift holography", was described by A. Pu, et al. at a talk given at the 1995 OSA Conference on Optical Computing, see conference proceedings—Technical Digest Series, vol. 10, pp. 219–221. It provides for high density packing of successive holograms in an x-y array. Overlapping holograms produced by shifting the medium in the "x-direction"—in the grating direction—are differentiated by first-order Bragg selectivity. By slanting the grating so that it lies on a plane oblique to the medium, second order Bragg selectivity may serve for selection in the y-direction. Reported densities are excellent, but required a thick (8 mm) recording medium.

Advances in the recording medium have not kept pace. Results reported by Pu, et al. used a free-standing crystal. Cost and manufacture expedience would profit by substitution of a supported organic material layer. To date, acceptable layered media have had a thickness of only one hundred or a few hundred $\mu$m. It will be some time before layered media of desired 8 mm and greater thickness are available. Further, work directed toward development of practical thick media has concentrated on organic polymeric material. These materials have a tendency to shrink during the recording step. While shrinkage is impeded in the plane of the medium by the adherent support, it is significant in the thickness dimension. This is a particular problem for z-direction second order Bragg selectivity for the reason that gratings produced by interference with different signal locations will have varying slant angles, with consequent non-uniform x-components. See Optical Engin. vol. 32, no. 8, pps. 1839–1847 (1993).

SUMMARY OF THE INVENTION

"Aperture selectivity", in the reconstructed beam, serves to differentiate overlapping holograms where Bragg selectivity is inadequate. As used in shift holography, aperturization supplants Bragg for y-direction differentiation, in which Bragg selectivity is degenerate or inadequate. For thin recording media, in which Bragg selectivity is limited by thickness, aperture selectivity may entirely replace Bragg selectivity.

Illustratively, a single aperture is used. Optimally, it is placed on a Fourier plane for image holography or on an image plane for Fourier holography. Of size and shape of the reconstructed beam in the dimension/s to be aperturized, selectivity in that direction is increased by an order of magnitude over that of spatial multiplexing.

DETAILED DESCRIPTION

General

Figure 1:
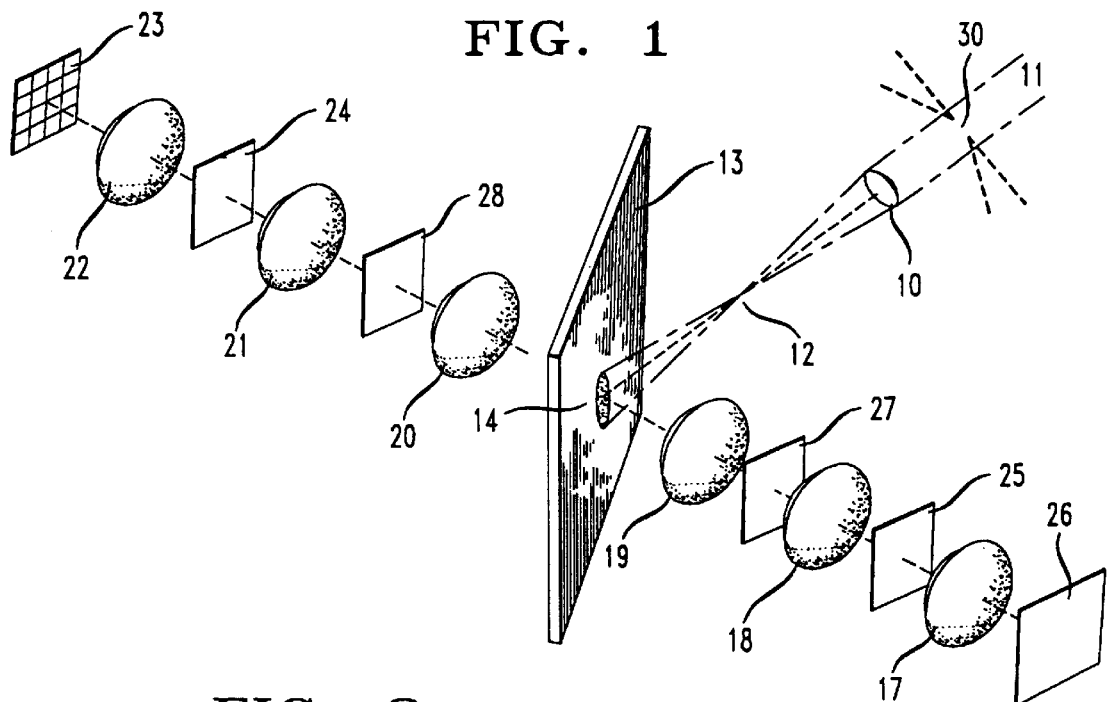
FIG. 1 is a diagrammatic view of apparatus suitable for practice of the invention.

To the extent possible, terminology used in description of prior art shift holography is used in description of the improved procedure. In shift prior art holography, the incoming signal and reference beams define the "plane of incidence" which is orthogonal to the recording medium. After recording a first hologram, the medium is shifted, relative to the beams, in stepwise fashion, along a scan direction which is defined by the line of intersection of the plane of incidence with the medium surface. After a series of overlapping holograms have been recorded, the medium is stepped in the direction normal to the scan direction within the plane of the medium, following which the procedure is repeated. The scan direction is referred to as the "x-direction": the step direction, as the "y-direction".

In prior art shift holography, y-direction selection is based on the comparatively weak second order effect. Poor selectivity in y is compensated by use of a thick recording medium. In reported work, the medium was a free-standing crystal with reference and signal beams introduced through orthogonal crystal surface. A published diagram suggests substitution of a plane-surfaced, layered medium, and as with the bulk crystal, continues to depend on an oblique grating (on a z-direction component in the grating).

It is convenient to describe the invention as a modification of shift holography. In principle, only one modification is required. An aperture restricts reconstructed beam size so as to limit the detected reconstructed image. If the reference beam has no y-component—if it is not spherical, but composed of an in-plane cylindrical wave or of multiple plane waves—y-component must be introduced. Experimentally, a constricting aperture in the incoming reference beam has been found adequate.

The general thesis is that Bragg selectivity in the y-direction is insufficient—that relatively-small second order Bragg selectivity for contemplated medium thicknesses is not usable. Contemplated structures depend on aperturization in the y-direction rather than on Bragg selectivity. In these terms, no purpose is served by deviating from the prototypical structure: a) plane of incidence orthogonal to the medium; and b) bisection of the x-z plane component angle defined between the reference beam and the signal beam at the medium by a line normal to the medium ($\theta$ is divided into two equal half angles). Accordingly, discussion assumes that the plane of incidence is orthogonal to the medium—i.e. that the relatively-small second order Bragg selectivity is inadequate. The assumption is certainly valid for thin media—for media of 2 mm or less in thickness. The magnitude of second order Bragg selectivity is small also for thicker media using expected geometries. Experimentally, better noise performance has been obtained for equal half angles—in which the reference and signal beams have the same angle of incidence measured from the direction orthogonal to the medium surface—thereby minimizing the z-contribution required for second order Bragg selectivity.

Description is largely in terms of a rectilinear array (with overlapping holograms in both x- and y-directions—with overlapping rows of overlapping holograms). Apparatus provides for linear step-wise movement of the planar recording medium relative to the beams for recording a first row of holograms, followed by stepping to the next row position, etc. Other arrangements providing relative movement of medium and hologram position are possible, e.g. by rotation with circular rows of differing radii.

Inventive Principle

Early use is expected to be as an adjunct to prior art shift holography, in which Bragg selectivity continues to be the basis for differentiation in the shift direction. X-direction is discussed as coincident with shift direction—"tilt shift holography" of co-filed U.S. patent application Ser. No. 08/435,706 now U.S. Pat. No. 5,703,705, while certainly suitable for use with aperturization, is ignored in the body of this description. Design considerations are identical for x-direction (with or without tilt).

The function of the aperture is to restrict passage to only the beam required for the desired reconstruction. Ideally, for an on-plane hologram, the aperture is on an optical plane and is precisely of the shape and size of the reconstructed signal beam. For Fourier transform holograms, an image plane filter gives maximum improvement in packing density. For image holography, an apertured filter on the Fourier plane gives best results. Where Bragg selection is the operative mechanism in the x-direction, the x-dimension of the aperture is of no significance from the standpoint of the invention. In principle, it may be a slit of indeterminate length, although with constriction in that direction, it blocks unwanted light.

Apparatus

The FIG. 1 apparatus was used for developing the criteria of aperturization. A spherical reference beam was used in the specific Examples. It had sufficient divergence angle of incidence in the recording medium 13 to introduce y-component and enable aperture-filtering in the y-direction. In other experimental work, using reference beams lying entirely in the plane of incidence (and still ignoring shift direction outside of the plane of incidence of the co-filed application), y-component was introduced by a constraining aperture 30 (schematically showing beam constriction and accompanying edge diffraction in phantom).

A reference beam with momentum in the y-direction (with a y-component of direction) was produced by spherical lens 10. Lens focus 12 was at a distance, d, from recording medium 13, producing reference beam spot 14 in the medium. Spot size was of area sufficient to cover the signal beam spot. The signal beam 15 was produced by illumination of spatial light modulator 26. The modulator allowed tailoring of individual holograms for experimental purposes. A Fourier transform of transparency 26 was produced in spot 14 by lens series 17, 18, 19, all in 4F configuration (17–26 and 19–14 spacings equal to focal distance, 17–18 and 18–19 spacings equal to the sum of focal distances of the lens pairs). Readout was by 4F-configured lenses 20, 21 and 22, to result in a reconstructed image on detector 23.

Aperturization depends on use of a filter for restricting the size of the 25 reconstructed beam—in this instance as appearing on detector 23. This may be accomplished empirically with respect to size/shape as well as position. Optimum results with but a single aperture—aperture 29—which can be at the Fourier plane or image plane (respectively, for image holography and Fourier transform holography). As so placed, aperture size need only conform with the transform/image dimension in the relevant direction. As elsewhere in this description, the term "aperture" does not necessarily connote a discrete apertured plate—the equivalent constriction may be implicit in or combined with an additional element. As an example, the detector e.g., CCD detector 23 may be of small size designed for this purpose.

Equipment variations, some of which were used in reported experimental work follow conventional practice. Elimination of a lens in each of the series 17–19 and 20–22, with the remaining lenses arranged in 4F configuration, substitutes image recording and continues to produce a reconstructed image on the detector. A filter 25 consisting of an apertured mask at the Fourier plane permitted passage of only the $0^{th}$ diffraction order. A random phase diffuser, placed either following spatial light modulator 26 or at image plane 27 in the signal beam may be used to smear out the Fourier transform and to improve recording fidelity. Other lens arrangements, both for image recording and for Fourier recording, are well known.

X-Direction Selectivity

The claimed process continues to depend on Bragg selectivity in the shift direction. Its value is considered for shift-direction and x-direction coinciding and for a normal plane of incidence. Using a reference beam made up of a finite number of plane waves, all in the plane of incidence, Bragg selectivity is restricted to x-direction. (The complicating consideration of second order Bragg selectivity is ignored, so that the reference beam and signal beam make the same angle with respect to a line perpendicular to the medium. The simplification is justified where the medium is too thin for adequate second order Bragg selectivity e.g., under conditions used in the Examples, for thickness $\leq 500$ $\mu$m.) Overlapping hologram rows are not effectively differentiated in the y-direction. A cylindrical beam is equivalent to a beam constituted of an infinite number of plane waves, and continues to lack y-selectivity. For purposes of this description, x-direction selectivity is essentially unchanged. Bragg selectivity for a spherical reference beam, as used in the specific examples, is approximately defined by:

$$\Delta x \approx \frac{\lambda d}{2L\sin(\theta/2)} + \frac{\lambda}{2(NA)}, \quad (1)$$

in which all quantities relate to the reference beam and are defined as:

λ=wavelength outside of the recording medium (approximated as the vacuum wavelength)

d=distance from the focus to the recording medium

L=thickness of the recording medium

θ=full angle between the reference and signal beams as measured at the surface of the medium NA=the numerical aperture of the lens.

Example 1

The recording medium was x-cut 2 mm thick Fe-doped LiNbO$_3$. With the lens arrangements of FIG. 1, the recorded hologram was a Fourier transform. Referring to Eq. 1:

θ=75°

λ=514 nm

L=2 mm d~4 mm lens 20—F/2.0, 200 mm focal length lens 10—F/2.83, 80 mm focal length Spatial light modulator 26 consisted of 640×480 pixels. The signal beam was filtered at the Fourier plane by filter 25 to pass only the 0th diffraction order. There was no aperturing in the reconstructed beam. X-direction selectivity was about 4 μm.

Y-direction selection depended on spatial multiplexing, equal to the recorded spot size of about 3 mm.

Figure 2:
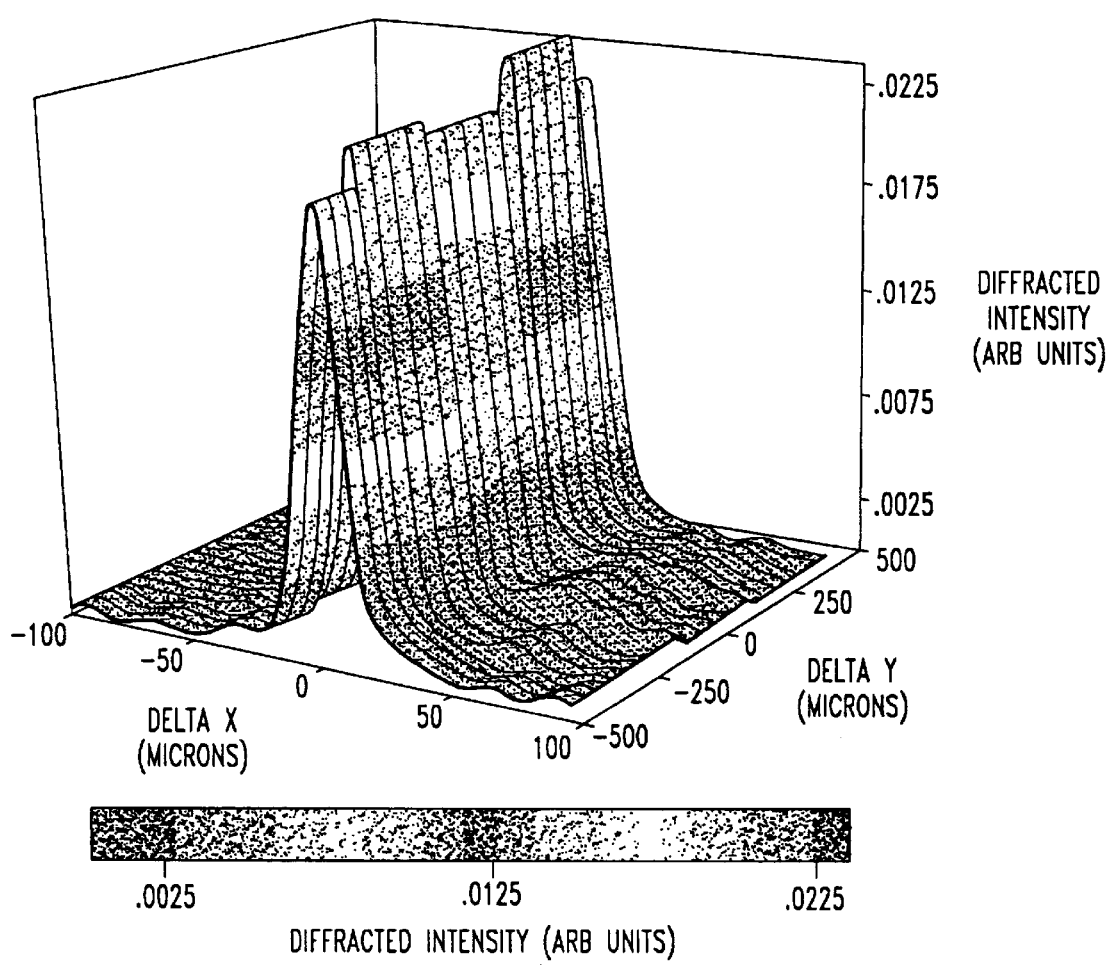
FIG. 2 shows the diffracted intensity of a single hologram without aperturization.

FIG. 2 shows diffracted intensity for a single hologram recorded in Example 1, and is representative for holograms made without aperturization (still on the assumption that second order Bragg selection is inconsequential). Intensity is plotted according to position in x- and y-directions, in units of μm, with the origin (x=0, y=0) showing the position in which the hologram is recorded. The full width at half maximum in the x-direction is approximately 4 μm. There is no selectivity in the y-direction.

Improved Y-Direction Selectivity Using Aperture Selection

In Example 1 it was necessary to shift the medium (relative to the beams) sufficiently to step by a distance equal to the spot size in the y-direction (to "spatially multiplex"). The invention teaches blocking of undesired reconstructions by aperturing. For the spherical wave reference beam, and for Fourier transform holography, this is accomplished by an image plane filter. For an optimal filter of the same size and shape as the signal beam at the image plane, y-selectivity is approximately defined by:

$$\delta y \geq d \frac{p}{F_2} \quad (2)$$

in which p=image size in the y-direction $F_2$=the focal length of lens 20 (the lens following the recording medium in the reconstructed beam)

d=the distance of the reference beam focus from the recording medium.

Example 2

Example 1 was repeated, however, with an apertured filter on the image plane. The aperture, slit-shaped with a slit-width of 1 cm, matched the y-dimension, p, of the approximately rectangular image. X-selectivity was unchanged at about 4 μm. Y-selectivity was about 200 μm. Thus, by filtering out the reconstruction (by aperturization), an order of magnitude improvement in y-selectivity was achieved.

Figure 3:
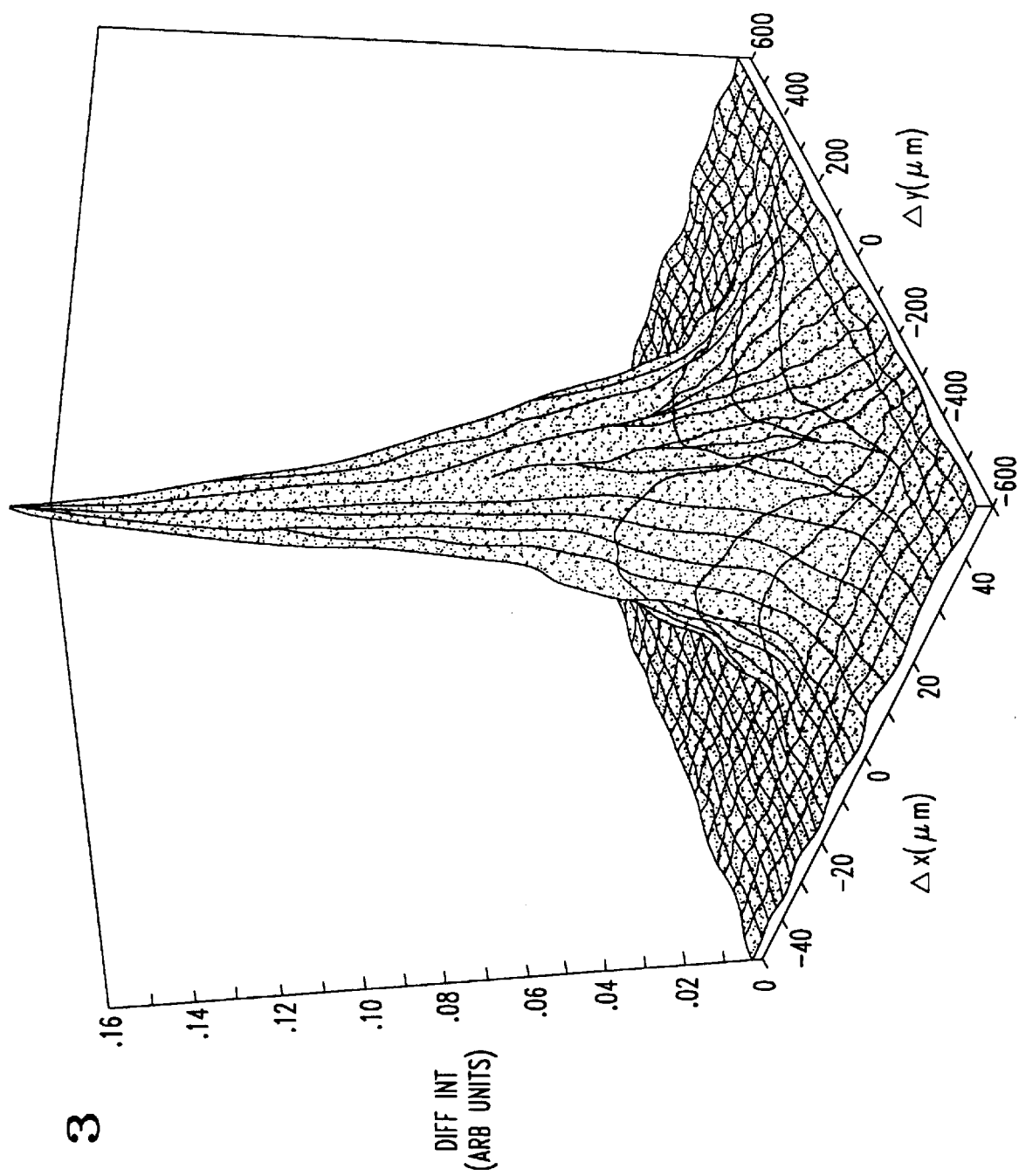
FIG. 3 shows the diffracted intensity of a single hologram using a single optimum aperture.

FIG. 3 shows the measured diffraction efficiency with aperturing. X-direction selectivity is retained at about 3.9 μm at half maximum. Y-direction selectivity is now about 200 μm which is consistent with results calculated from Eq. 2.

Example 3

The conditions of Example 1 were used for recording an array of holograms. Eleven rows each of 100 overlapping holograms each, were spaced by δx≅35 μm. Row-to-row spacing was by δy≅250 μm. X-spacing was at the ninth null to minimize noise which would result with minimal x-spacing. Y-spacing was adequate to assure avoidance of unwanted reconstruction. Aperturing increased packing density by about an order of magnitude.

Aperture Selectivity In the X-Direction

Under most conditions, using thick recording media, Bragg selectivity is the operative selection mechanism in the x-direction. For thin media—for media ≦100 μm under the conditions of the Examples—a beam-conforming on-plane aperture may offer some improvement. This embodiment may be quite significant unless and until thick media of appropriate uniformity become available. Under this circumstance, x-direction aperture-selectivity is of a value in accordance with Eq. 2 (with p being x-direction image size).

Replication

Many contemplated uses require making copies of the holographic array "master". This problem has been addressed for non-multiplexed holograms. *Handbook of Optical Holography*, Academic Press 1979, at pp. 373–377, describes a variety of techniques. One method, "copying by reconstruction", first reconstructs the image and thereafter records a new hologram. The method is applicable to thick as well as thin holograms, and has been used for multiplexed holograms as well. For multiplexed holograms, with usual single illumination source, it is necessary to reconstruct and copy "one at a time". The limitation is overcome with multiple, mutually-incoherent sources. See *Optics Letters*, vol. 17, no. 9, pp. 676–678, 1992.

Copying by reconstruction is usefully employed in the present work. The multiplexing step, independent of the individual hologram replication step, now follows the new procedure—medium and/or beams are stepped between sequential recordings.

The procedural variation in which aperturization is used in both x- and y-directions—"x-y aperture multiplexing"— offers a unique opportunity. Here, since selection does not depend on Bragg selectivity, there is no requirement for a thick medium. The, in consequence, permitted 2D array may be replicated in its entirety in a single step (or series of steps). Stamping and embossing, previously used for non-multiplexed 2D relief-phase holograms, becomes feasible. This form of hologram, in which the information is in the form of topological variations on a single free surface, is amenable to aperture shift multiplexing. Since replication is independent of formation of the master, an initial holographic film image may be converted to a surface hologram during this step.

A 2D hologram array, produced by x-y aperture multiplexing, may be replicated by any of the procedures used for non-holographic image reproduction. These include procedures used in photography. Generally, holographic processing using media analogous to photographic media, entails the additional step of bleaching. *Holography Handbook,* Ross Books, Berkeley, Calif., pp. 56,57, 1993. Bleaching is regarded as converting an amplitude image into a phase image—e.g., the developed film image, constituted of elemental silver particles in a matrix, is rendered colorless leaving an index variation as the only record of its presence. A form of multiplex replication may be carried out using an unconverted—unbleached master, and introducing the final bleaching step following recording of the multiplexed amplitude holograms.

There is a further possibility offered in replication of 2D arrays. Since all relevant information—now including that necessary for selection as well as for reconstruction—is independent of thickness, replication does not critically depend on wavelength. The entire array or a portion may be reproduced using a wavelength which matches the actinic properties of the new medium. Ordinarily, this leads to use of a wavelength shorter than that used during mastering and reconstruction.

Applications

The advance offers significant service opportunities. The holographic array, now in the possession of a user, may be selectively accessed for pay. An analogous prior art practice uses CD ROMs in which partitioned contents each containing prescribed software or data, with access to specific parts granted by corresponding access codes. See, *CD-ROM Librarian,* vol 7, no. 4, pp. 16–21, April 1992. Under certain circumstances, the array may be maintained on a local user site, with access to its entirety granted as part of an initial sale, by use fee or subscription.

In most uses, hologram/multiplex recording serves only for initial supply. The methods are suitable for such "read only" applications. Other uses are served by "write once"—as in creation of a lasting database. Facility for "read-write" is advanced in embodiments operating with 2D media.

Variations

The practitioner may choose to follow the explicit conditions discussed. Aperturing is optimal as described, with an on-plane aperture conforming in shape and size with the signal beam. Where image holography is used, approximately the same advantage in selectivity is obtained with a conforming aperture. Off-plane aperturing, while useful, will not give the same selectivity (for on-plane holograms)—selectivity may be improved by one or more additional apertures. Optimal conditions for off-plane holography have not been determined—may be determined empirically.

As with prior art shift holography, movement of beams with respect to the medium or movement of both beams and medium, may be equivalent to movement of the medium. Reference to "relative" movement is intended to encompass all such variations.

While description has been in terms of relative movement of the recording medium and the beams, specific apparatus discussion has largely been for a mechanically-moved medium. For many contemplated uses, use of a stationary medium and moving beams may be useful—may permit more rapid access. Such beam steering may reproduce the conditions for a stationary beam and moving medium. The facility may expedite alternatives to simple linear stepping.

A. P. Yakimovich, in *Opt Spectrosc.* (USSR) vol. 47, no. 5, November 1979, pp. 530–533. presents a model for z-direction selectivity for a spherical reference beam and a thick medium. In experiment, it has been possible to multiplex in the z-direction based on this mechanism, although to date packing densities have been only in the single digits. While inadequate for replacing x- and y-multiplexing, it may be used in combination with the inventive procedures.

The methods are applicable to non-planar media—to cylinders and other geometric forms. For 2D arrays produced in x-y aperturing, it may be advantageous to use flexible media in mastering and/or replication. The 2D nature of the array permits recording on spooled film and tape.

The multiplexing method of the invention is not specific to this particular form, so that recording may be based on reflection holography, may image the signal on the medium, or may record the hologram on a plane intermediate the Fourier and image planes of the signal.

Relative Motion

Prior art shift holography depends upon the concept whereby successive holograms are recorded to be partially overlapping. Generally, major portions of succeeding holograms occupy the same volume, with the portions occupying fresh volume defined by "shift". The identical concept plays a role at least in a preferred embodiment of the present invention. In order for this to occur in recording, it is necessary that position of incidence of the beams in the vicinity of the interference region be moved relative to the medium—during reconstruction, the analogous relative motion entails the single reconstruted beam, so that the position of incidence is now determined by the position of the hologram to be accessed.

Relative motion may be produced by movement of the medium, or by movement of the beams. Alternative to movement of the entire beam (by movement of source and all optical elements), the latter may take the form of a variety of forms of "beam steering", in which only a part of the optical train associated with the relevant beam is changed—by physical motion, by introduction of an additional element, etc. The terminology "moving the medium and the beams relative to each other" in appended claims is intended to include all such variations.

What is claimed is:

1. Process for shift holography comprising reconstruction of individual holograms contained in an array of partially overlapping individual holograms recorded in a medium, in which the array comprises rows of overlapping holograms defined as lying in the x-direction with rows arrayed in the y-direction, the process comprising illumination with a readout beam which is successively positioned, by movement of the beam and the medium relative to each other in order to locate each individual hologram, thereby producing a successively positioned reconstructed image beam, the readout beam and the reconstructed image beam defining a "readout plane",

CHARACTERIZED IN THAT the readout beam has a y-component of direction, in that an aperture approximating the beam size in the y-direction in the medium is interposed in the reconstructed beam, whereby selectivity in the y-direction is increased.

2. Process of claim 1 in which a major component of the line of intersection of the readout plane with the medium lies in the x-direction.

3. Process of claim 2 in which x-direction selection depends on Bragg selectivity.

4. Process of claim 3 in which the aperture approximates the beam size in the y-direction.

5. Process of claim 1 in which the aperture is on an optical plane.

6. Process of claim 5 in which the optical plane is an image plane, and in which the holograms are Fourier transforms.

7. Process of claim 1 in which the size and shape of the aperture approximates that of the beam in both x- and y-directions, so that selection of individual holograms is by aperture selection in both x- and y-directions.

8. Process of claim 7 in which the thickness of the medium $\leq 100$ μm.

9. Process of claim 5 in which the optical plane is a Fourier plane, and in which the holograms are images.

10. Process for replication of a holographic array of partially overlapping holograms
CHARACTERIZED IN THAT
holograms within the array are reconstructed by the process of claim 8 and in that the array is replicated by a procedure selected from the group consisting of stamping, embossing, and procedures used in photography.

11. Process of claim 1 in which the array is circular and comprises multiple concentric circular rows with holograms overlapping both within rows and from row to row.

12. Process of claim 1 in which the array comprises segments, each segment including multiple holograms, the process providing for access to selected segments of the array.

13. Process of claim 12 in which access to a selected segment is in accordance with access information for the selected segment.

14. Process of claim 13 in which the medium is in the possession of a user and access information is in the possession of a service provider.

15. Process of claim 1 including recording of at least a part of the array, in which recording includes interfering a reference beam and a signal beam in the recording medium.

16. Process of claim 1 in which the readout beam is a spherical beam.

17. Process of claim 1 in which the aperture is a discrete apertured plate.

18. Process of claim 1 in which y-component of direction is introduced by interposing a constricting aperture in the readout beam.

* * * * *